Aug. 26, 1958 A. R. CLARK ET AL 2,848,821
DRYING APPARATUS
Filed Aug. 26, 1953 2 Sheets-Sheet 1
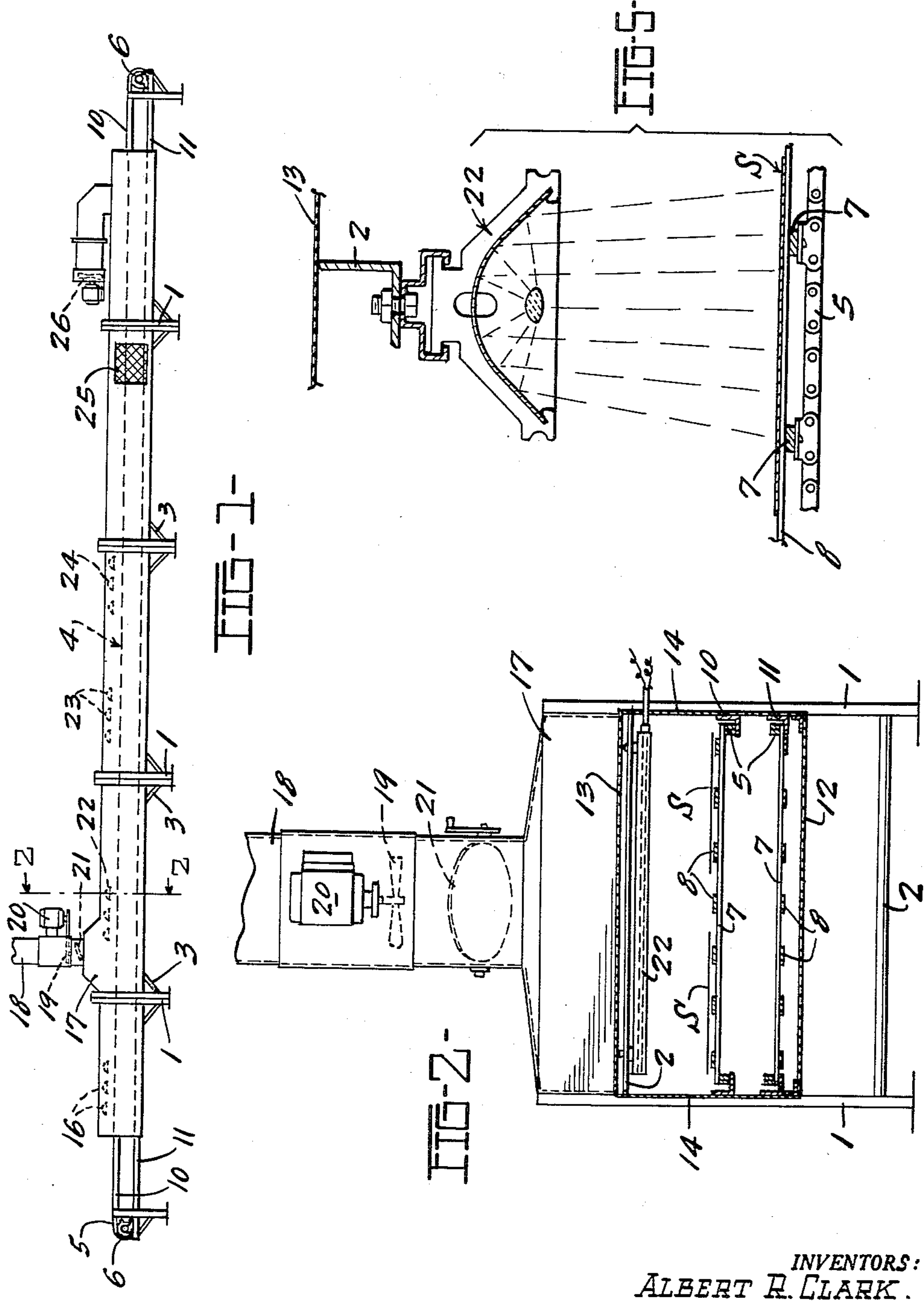
INVENTORS:
ALBERT R. CLARK.
BY WILLIAM B. CLARK.
W. P. Carr
ATTORNEY.

Aug. 26, 1958 A. R. CLARK ET AL 2,848,821
DRYING APPARATUS
Filed Aug. 26, 1953 2 Sheets-Sheet 2
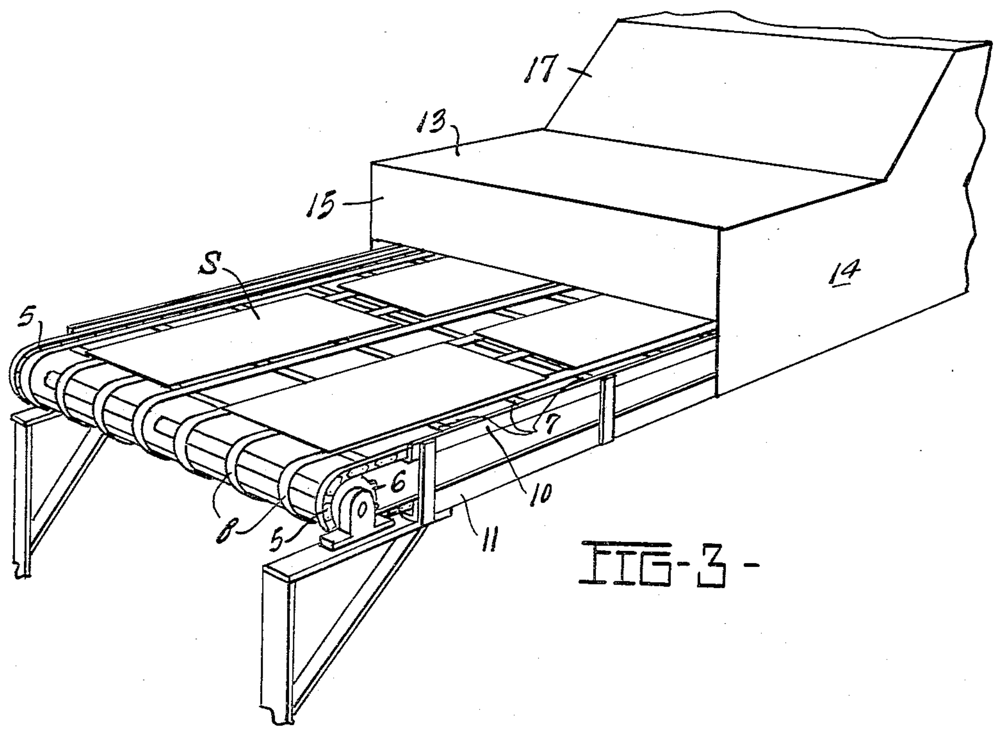
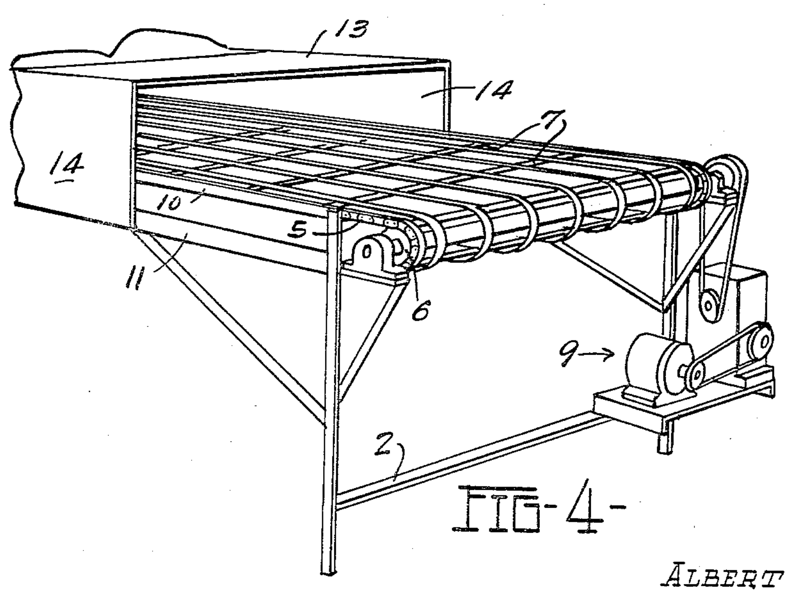
INVENTORS:
ALBERT R. CLARK.
BY WILLIAM B. CLARK.
W. P. Carr
ATTORNEY.

United States Patent Office 2,848,821

Patented Aug. 26, 1958

2,848,821

DRYING APPARATUS

Albert R. Clark and William B. Clark, Perrysburg, Ohio

Application August 26, 1953, Serial No. 376,705

5 Claims. (Cl. 34—66)

This invention relates to apparatus for removing volatiles from coated or impregnated articles and for otherwise rapidly conditioning such coated or impregnated articles whereby the treating material is sufficiently set for handling the articles without subsequent smearing or transfer of the treating material.

The invention is particularly adapted to rapidly and effectively set the coatings on signs and posters applied by the slik screen process.

Because of the nature of this coating process in which the coating material remains exposed to the air for a substantial period of time while it is being applied a slow driving quality is a necessity. Otherwise the coating substance would be inclined to thicken upon the screen stencil and would harden in the fine intermeshes of the screen. As a consequence silk screen coating compositions are formulated with oils and varnishes with retarded drying qualities. While the nature of such coatings permit trouble free application, there is the expected slowness in the drying of the resultant coating. This has long been taken as a matter of course by commercial sign painters who have patiently followed the trade accepted practice of taking each individual sign so painted, laying the sign in individual compartments of a drying rack or fastening hanging clips to it and suspending it from a supporting line or rod for a lengthy drying period.

For any substantial production such a procedure has not only required considerable handling labor but also demands a great amount of hanging or racking space and equipment. Working room may thus be entirely taken over, and in addition the evaporating constituents of the coating contaminate the atmosphere to an extremely disagreeable extent. As practically a necessity, further production is discontinued until the prepared signs have dried and may be stacked and the working space well ventilated. As this drying period may require at least several hours it is the usual procedure to shut up shop for the day and start the next day by disposing of the dried signs. It may be noted that in the course of racking and hanging operations disfigurement of many signs occurs through the accidental smearing of the coatings through contact with the operators, between signs, and with the hangers and racks.

The curtailment of production which such a drying procedure entails has been a handicap for which a solution has long been sought. Conventional drying and heating equipment found suitable for apparently comparable purposes have been tried without success. Attempts at building specially designed dryers have also failed. The high or concentrated heat without adequate ventilation used in such previous attempts did not prove successful evidently due to skin drying by which the undried inner material was sealed, insufficient air movement to carry away volatilized solvents whereby further evaporation was prevented by the saturated air, and also to the heat softened gums or resins remaining soft with absorbed heat.

Through a combination of features hereinafter described in detail and illustrated in the accompanying drawings, the apparatus provided by this invention achieves the objectives long sought by silk screen processors of rapidly and economically setting the applied coatings whereby the coated signs may be piled or stacked without smearing or transfer of coating material and production of signs may be continued without interruption. Further objects secured by this invention include the maintenance of an unpolluted atmosphere, the retention of full working space and greatly increased production capacity. These and other objects and advantages which will become apparent with a study of the following description and drawings are attained by a novel combination of heat and air movement means associated with a conveyor, characterized by a limitation in and special application of heat which heretofore has been considered the prime source of a possible solution and which has been erroneously amplified in face of failure with no corresponding gain in results.

In the drawings,

Figure 1 is an elevation of the complete apparatus embodying our invention;

Figure 2 is a vertical section taken on the line 2—2 of Figure 1;

Figure 3 is a perspective view of the loading end of the apparatus;

Figure 4 is a similar view of the unloading end; and

Figure 5 is a sectional view of one of the heating elements.

Referring to the drawings, the drying apparatus is shown supported upon a frame composed of uprights 1 connected by cross bars 2. The uprights are individually braced by angled struts 3.

The loading end of the conveyor 4 which runs the full length of the apparatus is at the left of Figure 1. The conveyor has endless roller-type chains 5 along the sides which run over sprockets 6 at the ends of the apparatus. Transverse angle irons 7 which are fastened at their ends to the chains provide the main supporting structure of the conveyor. The angle irons are spaced approximately six inches apart. Running longitudinally of the conveyor over the angle irons are flat fabric belts 8 of two inch width. These are bolted to the angle irons at sufficient points to keep them in place and spaced about six inches apart across the conveyor. The fabric belts are heat insulators and do not draw heat from portions of the signs with which they have contact. This is of particular importance in retention of heat by the signs and the avoidance of slow drying lines or areas corresponding to the conveyor surface supporting the signs.

A motor drive 9 with variable speed control has a chain connection with the conveyor sprocket at the unloading end. The speed may be governed therethrough at rates varying from 15 to 60 feet per minute. The conveyor chains run on upper and lower pairs of angle iron tracks 10 and 11, which are welded to the panel sides of the apparatus. The angle iron tracks serve also as lengthwise supporting beams for the apparatus. Bottom and top panels 12 and 13 form, with the side panels 14, a tunnel or drying chamber running the full length of the apparatus except at the terminals where the conveyor is exposed for loading and unloading purposes.

The freshly prepared silk screen signs are laid on the entering end of the conveyor as they are removed from the silk screen machine. They are usually produced fast enough to be positioned with their adjacent edges close to each other. The coated surface is of course faced upwardly.

The drying action begins as soon as the signls enter the conveyor tunnel or drying chamber. The entering end of the tunnel is substantially closed to a level a few inches above the conveyor surface by a vertical apron 15. This minimizes the air flow through the first section in which there is a set of three long wave infra red rod heaters 16 positioned about 14 inches above the conveyor. These heaters are parallel and extend across the chamber in a horizontal plane. They have a combined capacity of 7.5 kilowatts estimated to provide 25,000 B. t. u.

The nickel chrome type of heaters utilized in this invention emit relatively low infra red rays which are absorbed with a minimum of reflection in quite a uniform manner by various colors and ingredients of silk screen coating materials. These heaters also have the valuable quality of discharging a heat band of equal force throughout their length. Such factors contribute to a thorough drying of the full extent of the coating material.

Just beyond the first section is the drying air exhaust manifold 17 and outlet to which a vertical exhaust stack 18 is attached. In the stack is a conventional air flow inducing fan 19 driven through a belt by a ⅓ H. P. electric motor 20 mounted exteriorly of the stack. In the stack below the fan is a damper 21 by which the volume of the air flow may be variously reduced from the approximate maximum of 3800 cubic feet per minute but preferably set to create an air flow through the main portion of the chamber between 100 to 200 feet per minute. The air thus withdrawn is expelled to the exterior of the building.

Closely adjacent the air exhaust manifold 17 and slightly beyond it is a second bank 22 of three infra red heating bars of the same capacity as the first set. Preferably there are two additional similar banks 23 and 24 well spaced from each other along the center portion of the drying chamber.

In the section beyond the last bank 24 of heaters and some distance therefrom there are large screened air entering openings 25 in both sides of the drying chamber.

In the final section of the chamber just ahead of the uncovered unloading end of the conveyor there is an opening in the top through which fresh air directly from the working room is forced by the motor driven fan 26 into the drying chamber. This fan delivers approximately 1100 cubic feet of air per minute.

In the operation of this drying apparatus the signs are preferably coated at a station adjacent the loading end of the conveyor and taken directly from the coating machine and laid in close sequence upon the conveyor. In the event the signs are of a size which occupy only half of the conveyor width of five feet a coating machine may be stationed on each side of the conveyor and the signs from both machines loaded simultaneously.

Silk screen coatings have two characteristics which distinguish them from most other applied coatings. The first of these is the slow drying required by the nature of the process. This retarding in the setting up or drying of the coating material is obtained through the inclusion in the composition of castor oil, boiled oil, litho varnish or other heavy slow-drying varnishes. The second characteristic is the relative extra thickness of the coating. This is due to the fact that the deposited coating material is that remaining after the squeegee passes over the stencil fastened upon the silk screen and it has therefore the thickness of both the screen and the superimposed stencil.

These characteristics combine in making the drying a particularly tough problem and unlike that of other coatings. As previously stated the standard procedure has been racking or hanging for many hours.

In the drying of such coatings there are a number of actions involved that evidently have long been ignored or at most only partially taken into consideration.

Primarily the solvent of the coating material must be volatilized and dispelled from throughout the full thickness of the coating. Of almost equal importance the retarding varnish type ingredients must be to some degree oxidized. At the same time neither action may proceed too rapidly in relation to the top surface of the coating or otherwise such action in regard to the inner material will be retarded by the sealing action of the set surface.

In recognition of these factors the first zone of the drying chamber of the subject invention applies heat of a penetrating nature to the coating but restrains evaporation of solvents and oxidation of varnish ingredients by maintaining in this first zone a quiescent atmosphere with little air movement to carry away solvents or supply air for oxidation. In this manner the solvents throughout the coating are heated to a vaporizing stage with volatilization curtailed by the comparatively stagnant air. Full benefit of the heating is secured without the reduction in temperature accompanying evaporation. No immediate thickening or setting of the outer surface of the coating is consequently produced.

From this first zone the signs proceed to the active drying stage of the drying chamber. In this subsequent section there is first the exhaust outlet which draws air mostly from the outlet portion of the conveyor. This air having passed over the signs advancing through the drying chamber is at its most solvent saturated point.

The addition of heat through the bank of heaters immediately beyond the air exhaust location in combination with the strong air movement in that section rapidly withdraws the solvent not only from the surface of the coating but also from the interior thereof due to the thorough heating of the solvent in the first stage and the non-sealing of the surface. This action is continued through the subsequent heating sections in combination with the substantial air flow therethrough.

While such application of heat and substantial air contact effectively removes the major portion of the solvent in the coatings and has hastened the oxidation of the retardent varnishes or other substances there remains a residue of gums and varnishes softened by the heat and not completely oxidized. These substances may maintain the surface of the coating sufficiently tacky to cause smearing or offsetting on contact. To counteract this tendency and prepare the signs for side-to-side stacking a cooling action which is initiated by the inflow of air through the side openings is amplified in the final section of the drying chamber by the downward draft of unheated air from the air input fan. The direct impingement of this air against the surface of the signs has a stronger effect thereon than an equal quantity of air passing over the signs in a parallel stream. This additional air applies a final comparatively chilling effect to the coating which is inclined to harden any heat softened gums and completes the drying action. This above described procedure has been equally effective in the drying of fluorescent silk screen paints which are applied in a heavier coating and have a composition particularly resistant to drying. The signs are thus readied for immediate stacking or piling on delivery from the outlet of the conveyor. This stacking may be done manually or be automatic through a spring supported receiving frame positioned at the end of the conveyor. Such a receiver sags downwardly under the accumulating weight of the signs, providing room for the reception of subsequent signs.

While the embodiment of the invention disclosed has four heating stations, at lower rates of conveyor travel and for coatings of lesser thickness two or three heating stations may suffice. Any reduction in number is made from the unloading end. To suit various conditions the heating units in use are controllable within a range of 0 to 100% of capacity.

In addition there may be situations where no power driven input air is required with dependence place upon the air drawn into the drying chamber by the exhaust fan for cooling action.

It may be observed from the preceding description and explanation that applicants have devised an apparatus combining multiple features in a novel arrangement which provides a solution for a perplexing problem of long standing.

While it is the belief of applicants that all elements contribute to the success of their apparatus to a more or less degree, several features are considered to be of special importance.

These include the conveyor structure with large openings between the cross bars and the longitudinal fabric belts which permit access of air to the underside of the signs and the non-heat conducting nature of the fabric belts upon which the signs rest. This conveyor design has a share in effecting the uniform heating of the sign coatings.

Significant value is placed on the function of the first section of the drying chamber in which the air circulation is minimized and preparatory heat is radiated into and stored within the full thickness of the applied coating.

Also, essential to the effectiveness of the equipment is the subsequent application of heat in combination with a substantial flow of air. These cooperate in withdrawing and carrying away the volatile constituents and in the oxidation of resinous materials. The heat is applied in a comparatively moderate degree.

Of supplemental but not inconsiderable importance is the final cooling of the coating resulting from the inflow of air through the side openings and the downwardly directed air from the input fan. This effects a hardening of the heat softened gum ingredients.

It may seem therefore that while only one embodiment is presented variations may be made therein in certain instances without loss of advantages and with retention of the spirit of the invention. Likewise changes in dimensions and capacities may well be made without lessening in the operational efficiency.

The apparatus as herein illustrated and primarily described with four banks of heaters with a total capacity of thirty (30) kilowatts providing approximately one hundred thousand (100,000) B. t. u. should, according to the experience of applicants, be about seventy five (75) feet in length with a conveyor speed from forty (40) to sixty (60) feet per minute. Excellent results have been obtained at the speed of sixty (60) feet and it is considered that still faster conveyor travel is entirely feasible with the use of the more rapidly drying coating materials.

For somewhat lower production an apparatus having a length of sixty (60) feet may be suitable. For effective coordination of the treating factors, in such an apparatus three banks of heaters is considered sufficient with a conveyor movement between twenty-five (25) and forty-five (45) feet per minute.

Similarly, a forty-five (45) foot apparatus may have only two banks of heaters with the conveyor driven between fifteen and thirty feet per minute.

The width of the conveyor may also be varied to suit production requirements. The transverse length of the heating elements would be lengthened or shortened accordingly and the air capacity of the fan means increased or decreased as necessary to maintain the desired optimum air movement.

A feature of this invention not previously referred to but which is of high value in labor, space and time savings is the conditioning or seasoning effect upon the paper and cardboard to which the coatings are applied. Incomplete preconditioning of the stock before shipment by the mill, unfavorable humidity conditions in transmit, in warehouses, or in the sign shop itself result in paper or cardboard subject to expansion or shrinkage rendering fine registration of sequential colored coatings most difficult despite all precautions that may be taken.

A not unusual practice has been the allocation of a special paper drying room in which the individual sheets are hung for drying or seasoning periods of at least hours but more usually of days. For hanging purposes an edge of the sheet is frequently used that must later be trimmed before the sheet is coated. Even this procedure of predrying may not be successful if the humidity in the seasoning room is not closely controlled.

With the use of the apparatus provided by this invention no such preliminary treatment is needed. The first color is applied to the sign stock and the signs with the primary coating delivered through the apparatus. The drying of this first coating is accompanied by a most reliable seasoning of the paper or cardboard stock. The drying action upon the paper is not extreme because of the comparatively low temperature and high air movement. As a result, after removal and during the intervals between the application of the following colors the stock is not in such a dried state or at such variance in humidity with the workshop atmosphere that it readily absorbs additional moisture.

With this initial seasoning the sign assumes a fixed dimensional form and the stencils for subsequent colors are then cut to conform with the first applied coating and fine registration between the following colors is secured without trouble from any further shrinkage or expansion.

Having thus described our invention, we claim:

1. In a drying apparatus a tunnel-like drying chamber of substantial length, a continuously traveling conveyor running through the full length of the chamber, spaced transverse bars forming the main supporting structure of the conveyor surface, spaced fabric belts running longitudinally of the conveyor super imposed upon and fastened to the transverse bars, a first section of the chamber, means in said first section blocking air flow therethrough, heat radiating means mounted near the top of the first section, exhaust means beyond the first section drawing air from the chamber, a second section of the chamber beyond the exhaust means, additional heat radiating means mounted near the top of the second section of the chamber at three spaced apart stations, large air entering openings in the sides of the chamber beyond the additional heat radiating means, and a motor driven fan impelling air into the chamber beyond the air entering openings.

2. A drying apparatus as set forth in claim 1 in which the heat radiating means are of rod form extending across the full width of the chamber and discharging downwardly uniformly across the chamber.

3. A drying apparatus as set forth in claim 1 in which the exhaust means has an air moving capacity of at least double that of the motor driven fan impelling air into the chamber.

4. A drying apparatus as set forth in claim 1 in which the air flow through the second section of the chamber is at a rate between 100 and 200 feet per minute.

5. In a drying apparatus, an elongated drying chamber, a continuously moving conveyor extending through the chamber and beyond the ends thereof, spaced transverse bars forming the main supporting structure of the conveyor surface, spaced fabric belts running longitudinally of the conveyor super-imposed upon and fastened to the transverse bars, a loading station at one end of the conveyor, an unloading station at the other end of the conveyor, a first section of the chamber adjacent the loading station, a second section of the chamber following the first section, means radiating heat downwardly toward the surface of the conveyor in both the first and second sections, exhaust means between the first and second sections for drawing air longitudinally through the first and second sections and then discharging it from the chamber, means in the first section partially blocking the flow of air longitudinally thereof toward the exhaust means, and means providing a large air entering opening into the second section, whereby a major portion of the air withdrawn from the chamber by the exhaust means arrives from the second section.

References Cited in the file of this patent

UNITED STATES PATENTS

| | | |
|---|---|---|
| 1,334,840 | Collins | Mar. 23, 1920 |
| 2,349,300 | Olsen | May 23, 1944 |
| 2,529,704 | Olsen | Nov. 14, 1950 |
| 2,542,064 | Tilden | Feb. 20, 1951 |
| 2,677,195 | Menning | May 4, 1954 |

FOREIGN PATENTS

| | | |
|---|---|---|
| 635,565 | Great Britain | Apr. 12, 1950 |